United States Patent [19]
Schwarz et al.

[11] 3,845,855
[45] Nov. 5, 1974

[54] HELICAL SCREW-TYPE CONVEYOR

[75] Inventors: Karl E. Schwarz, Horseheads;
Donald E. Yeman, Elmira Heights, both of N.Y.

[73] Assignee: BMT Manufacturing Corporation, Elmira, N.Y.

[22] Filed: Jan. 12, 1973

[21] Appl. No.: 322,970

[52] U.S. Cl. .............................................. 198/213
[51] Int. Cl. ............................................ B65g 33/00
[58] Field of Search ............................ 198/213, 64

[56] References Cited
UNITED STATES PATENTS
2,055,725  9/1936  Johnson .............................. 198/64

FOREIGN PATENTS OR APPLICATIONS
1,531,081  7/1969  Germany ........................... 198/213

Primary Examiner—Evon C. Blunk
Assistant Examiner—Douglas D. Watts
Attorney, Agent, or Firm—Charles S. McGuire

[57] ABSTRACT

A conveyor for moving items, such as the hooked end of garment hangers, along a rotating rod or tube by means of a helical element extending along and affixed to the outside of the rod. The conveyor is supported at various points along its length by pairs of bearing elements which engage the top and bottom of the helical element, allowing the latter to rotate with the rod, with each side of the bearings open to allow the neck of the hangers to pass unobstructed. The invention resides in the provision of means for conveying hangers having hooks which are thicker than helical element, and thus normally unable to pass through the bearing supports. This feature is provided by reducing the diameter of the rod in the portion of the length thereof adjacent bearing supports while maintaining the outer diameter of the helical element constant so that the clearance between the bearing element and rod is greater than the thickness of the hanger hook passing therebetween.

4 Claims, 4 Drawing Figures

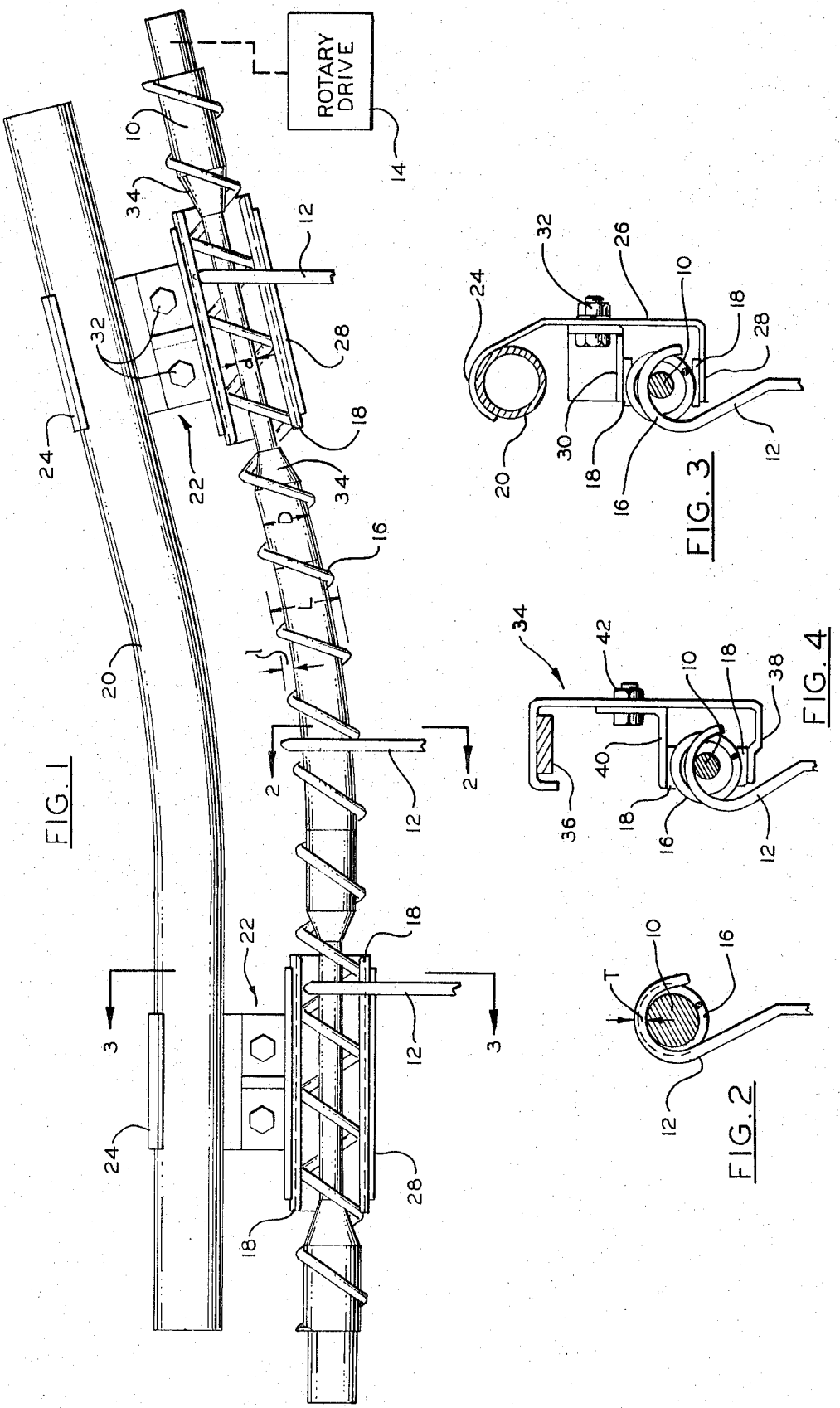

HELICAL SCREW-TYPE CONVEYOR

BACKGROUND OF THE INVENTION

The present invention relates to screw-type conveyors of the type having a helical element affixed to a rotating rod and supported by fixed, open-sided bearing supports.

Screw-type conveyors are commonly used to move garment hangers automatically along a desired path in garment factories, warehouses, dry-cleaning plants, and the like. A common form of such conveyor comprises a rotatable rod or tube, which may have flexible portions to allow rotation to be transmitted through non-linear sections, with a helical element affixed to the outside of the rod. Rotation of the element moves hangers suspended from the rod along the length thereof.

The use of such conveyors has heretofore been limited to use with hangers having hooked ends of lesser thickness than the helical element on the conveyor rod. Since the conveyor is supported members engaging the outside of the helical element on the top and bottom, with one or both sides open to allow passage of the closed side of the hook, the top of hanger must pass between the support member and the rod. The distance between the two is defined by the thickness of the helical element, which is greater than the diameter of common wire hanger hooks, but less than many plastic hangers now in use. Thus, helical screw-type conveyors have generally been considered unsuitable for handling garment hangers having relatively thick hooks, particularly plastic hangers.

It is a principal object of the present invention to provide a helical screw-type conveyor suitable for transporting garment hangers having hooked ends thicker than the helical elements which move the hangers.

A further object is to provide a screw-type garment hanger conveyor which will accommodate plastic hangers in a more expeditious manner than a similar conveyor for only wire hangers.

In a more general sense, the object of the invention is to provide a novel and improved garment hanger conveyor with expanded capabilities.

Other objects will in part be obvious and will in part appear hereinafter.

SUMMARY OF THE INVENTION

In the disclosed embodiment, the invention comprises a rod or tube having an element would helically upon the outer surface thereof. The element is of circular cross section considerably smaller in diameter than the rod upon which it is wound. Support members are provided as necessary along the length of the rod, and comprise fixed bearing members which engage the helical member on the top and bottom, having open sides to allow the closed end of the garment hanger to pass.

The diameter of the helix is maintained constant along the entire length of the conveyor, but the diameter of the rod is reduced in areas adjacent the contact between support bearings and the helical element. The increased distance thus created between the top of the rod and the bearing element allows passage of the hangers.

BRIEF DESCRIPTION OF THE FIGURES

FIG. 1 is a side elevation of a preferred embodiment of the invention;

FIG. 2 is an end elevation in section on the line 2—2 of FIG. 1;

FIG. 3 is an end elevation in section on the line 3—3 of FIG. 1; and

FIG. 4 is an end elevation, as in FIG. 3, of another embodiment of the support means.

DETAILED DESCRIPTION

The conveyor of the invention may be provided in any desired length, to follow any desired path with gradual directional changes. A representative fragment of a length of the conveyor is shown in FIG. 1. Central rod 10 of circular cross section supports hooked ends 12 of conventional garment hangers. Conventional drive means, indicated diagrammatically by reference numeral 14, are provided for imparting rotation at the desired speed to rod 10.

Encircling rod 10 is helical element 16, formed by winding a metal wire or rod in a spiral on the surface of rod 10. Helical element 16 is affixed to shaft 10 for rotation therewith, and supported by bearings 18 formed of fixed blocks of nylon, or other suitable material exhibiting low friction and good wear characteristics.

The conveyor is suspended from any convenient fixed support, shown in the embodiment of FIGS. 1–3 as rail or tube 20, by support members 22. The spacing of the support members and length of the bearings are a function of the anticipated maximum load of the conveyor, and other such design factors associated with particular applications. Support members 22 include end portion 24 for engagement with fixed support 20, side portion 26, and bottom portion 28, formed as a single piece, and brackets 30 affixed to side portions 26 by bolts and nuts 32. Bottom portion 28 and bracket 30 each holds one of bearings 18, the side of support members 22 opposite side portions 26 being open to allow the closed side of hooked ends 12 to pass the support members 22.

Rod 10 includes flexible sections where directional changes in the conveyor are desired. Such sections are standard items of manufacture and form no part of the present invention. In accordance with the invention, rod 10 is provided with portions of significantly different diameters. The smaller diameter is denoted with the letter $d$ where the rod lies between two bearings 18, and the larger diameter with the letter $D$ in other areas. Tapered sections 34 join the sections of different diameter and also lie substantially outside the area between bearings.

The diameter of the outer periphery helix formed by element 16 is denoted $L$ and the diameter of the element itself, "1". Since helical element 16 is wound on the larger diameter portion of rod 10, the diameter of the inner periphery is $D$. The thickness of the upper part of hooked end 12 of the garment hangers is denoted $T$. As is apparent from the drawings, $T$ is larger than 1, which is the distance between the surface of rod 10 and the outer periphery of the helical element. Thus, the top of the hangers is above the top of the helix where the hangers are suspended on a portion of the rod of diameter $D$.

Prior to passing between two bearing members 18, hooked ends 12 ride down tapered sections 34 and, by the time they reach the area between the bearings, are supported on a portion of rod 10 having diameter *d*. The relative dimensions are such that T is less than L/2 −*d*/2, the difference in radii between the outer periphery of the helical element and the smaller diameter portion of the rod. Thus, sufficient clearance is provided for the hooked ends to pass the bearings. It will be noted that L, the diameter of the outer periphery of helical element 16, is substantially constant throughout the length of the conveyor, although rod 10 varies between smaller and larger diameters. Therefore, helical element 16 must be rigid and self-supporting since it does not contact rod 10 in the areas where it is supported between bearings 18.

Referring now to FIG. 4, a different embodiment of support structure is shown. The same numerals are used for elements common to the previous embodiment, i.e., rod 10, hooked end 12, helical element 16 and bearings 18. Increased bi-directional strength is provided in the present embodiment by suspending fixed supports in the form of U-shaped channel members 34 from rectangular sectioned rail 36. The lower of bearings 18 is affixed to lower arm 38 of channel member 34. The upper bearing is affixed to angle 40, attached by bolts and nuts 42 to the side of channel member 34.

Thus, a helical conveyor has been disclosed which is capable of transporting garment hangers having hooked end portions thicker than possible with prior systems of the same general type. The central rod is tapered from its normal diameter, on which the helical element is wound, to a smaller diameter in areas adjacent the bearings.

What is claimed is:

1. A helical screw-type conveyor rotatable to advance items suspended therefrom, said conveyor comprising in combination:
    a. a central rod of first diameter over the major part of its length and having a portion of second diameter, substantially smaller than said first diameter, for a predetermined distance along its length;
    b. said rod having tapered portions at each end of said second diameter portion, whereby the diameter changes gradually between said first and second diameters;
    c. a helical element surrounding said rod and rotatable therewith;
    d. bearing support members contacting said helical element on both the top and bottom thereof, at least the portion of said support members contacting the top of said helical element being arranged adjacent said second diameter rod portion and having a length not exceeding said predetermined distance.

2. The invention according to claim 1 wherein said helical element is transversely rigid and has a cylindrical inner periphery of uniform diameter equal to said first diameter, whereby said helical element inner periphery contacts said first diameter rod portions and is spaced from said second diameter rod portion.

3. The invention according to claim 2 wherein said helical element is of circular cross section.

4. The invention according to claim 3 wherein said helical element is rigid in the transverse direction.

* * * * *